Dec. 29, 1964  W. L. McGRATH  3,163,100
CONTROL FOR AN AIR DISTRIBUTION SYSTEM
Filed Jan. 18, 1962  3 Sheets-Sheet 1
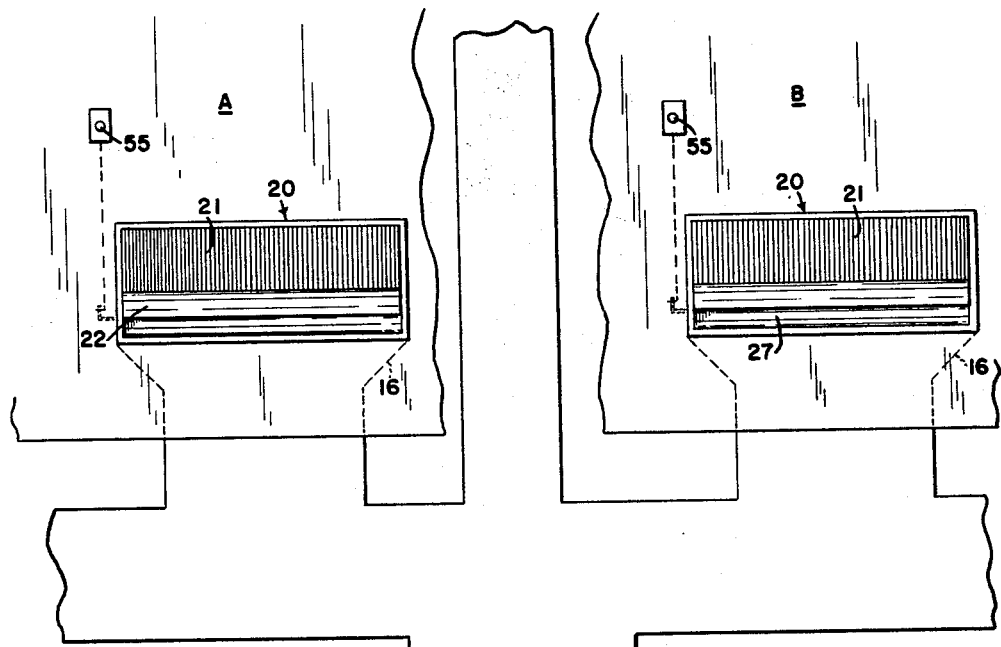
FIG. 1
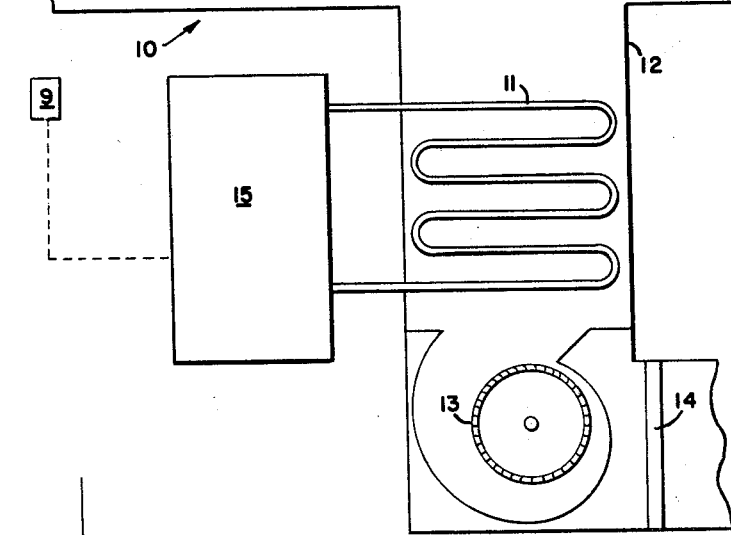
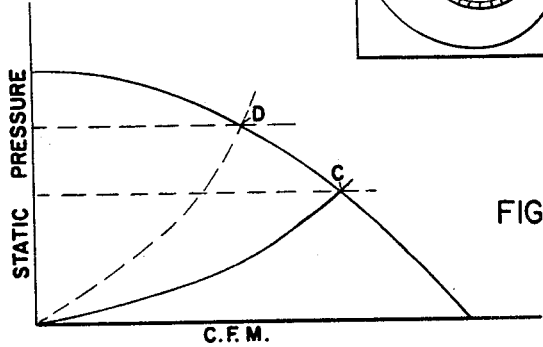
FIG. 5
INVENTOR.
WILLIAM L. MC GRATH.
BY
*Seymour Rothstein*
ATTORNEY.

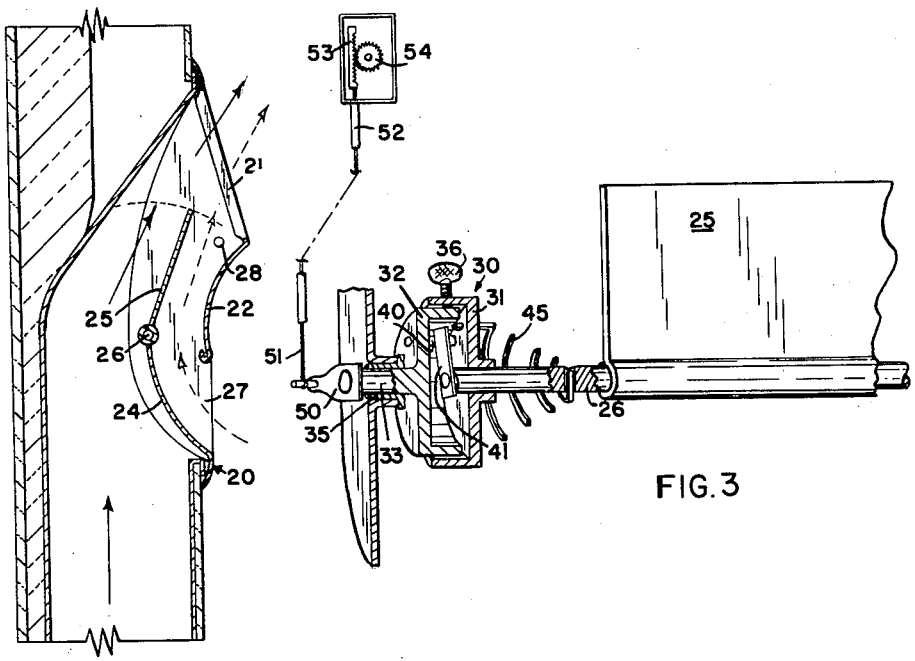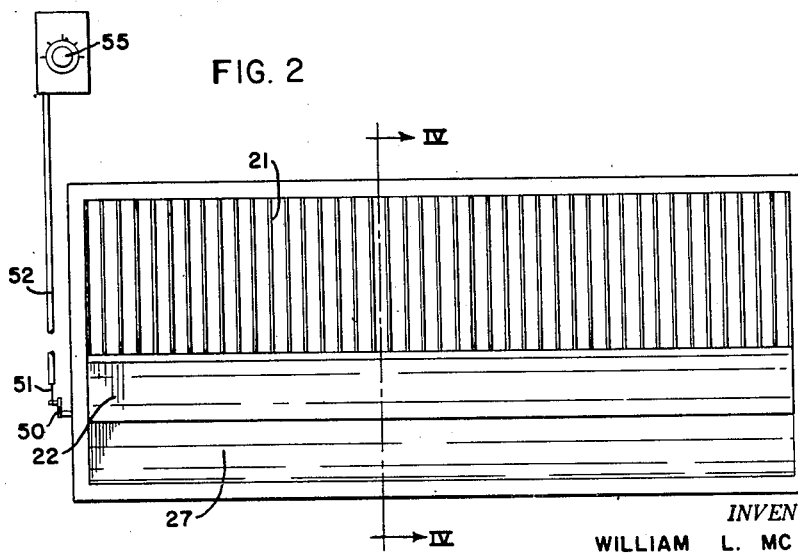

Dec. 29, 1964   W. L. McGRATH   3,163,100
CONTROL FOR AN AIR DISTRIBUTION SYSTEM
Filed Jan. 18, 1962   3 Sheets-Sheet 3

INVENTOR.
WILLIAM L. MC GRATH.
BY
ATTORNEY.

United States Patent Office 3,163,100
Patented Dec. 29, 1964

3,163,100
CONTROL FOR AN AIR DISTRIBUTION SYSTEM
William L. McGrath, Syracuse, N.Y., assignor to Carrier Corporation, Syracuse, N.Y., a corporation of Delaware
Filed Jan. 18, 1962, Ser. No. 167,106
4 Claims. (Cl. 98—39)

This invention relates to air conditioning, more particularly to means for selectively adjusting the distribution of conditioned air to conditioned areas without interfering with the operation of the air conditioning system.

A variety of equipment has been evolved serving to maintain the air in any given area under desired temperature, humidity, and purity conditions. This is generally accomplished by suitably treating the air in the conditioned area by means of heaters, refrigeration equipment, humidifiers and/or air purifiers of a variety of types functioning alone or in combination. After suitable treatment, the conditioned air is distributed to the conditioned area via suitable supply ducts through registers which function to control air distribution paths and velocity in the conditioned area. It is also desirable to recirculate some of the previously conditioned room air admixing it with newly conditioned air to obtain desired air change and air movement.

Where a central air conditioning system is employed to provide air of desired characteristics to a variety of different remotely located areas, conditions in these remotely located areas may vary sufficiently so that different occupants of different areas will require different rates of air conditioning. Thus where a centrally located refrigeration system is employed to control air for distribution to different rooms of a building, the occupants of a room exposed to the sun or some other heat load would require a greater rate of cooling than those in rooms in shaded portions of the building. As is apparent, a happy medium of refrigeration system operation or heating system operation such as will please the occupants of different parts of the building will not often be attainable.

Individual control of the air conditions in a given area to which air is fed from the air conditioning equipment is often controlled by controlling the flow of air to these areas. Thus a heating or cooling coil is positioned in a duct through which air is directed to the various areas to be conditioned. Dampered outlets at these areas permit the occupants to control the flow of air to the conditioned area by adjustment of the damper at the outlet. It is found, however, that conditions often arise where enough of the outlets from the air supply ducts are closed so that there is a rise in static pressure within the duct and a resultant decrease in flow of air over the heating or cooling surfaces. The resultant decrease in air flow over the heating or cooling surfaces results in an imbalance within the refrigeration or heating system due to a lack of required heat exchange between the heat transfer medium and the air.

It is with the above problems and desiderata in mind that the present means have been evolved, means apparatus serving to permit the individual control of air distribution from air conditioning equipment to a conditioned area in which the occupant of the conditioned area may selectively determine the quantities of conditioned air provided without interfering with the functioning of central air conditioning equipment utilized to condition air for other areas.

It is accordingly an object of this invention to provide improved means for controlling air distribution from air conditioning equipment. It will be understood by those skilled in the art that the term "air conditioning" includes heating, cooling, humidifying, dehumidifying and air purifying, whether for industrial or comfort purposes.

A further object of the invention is to provide improved means for controlling air distribution from a central conditioning point at a variety of different distribution points with the control action provided at any one distribution point not adversely affecting the operation of the conditioning equipment.

It is an additional object of the invention to provide a novel air discharge register serving to implement the distribution of conditioned air, and the admixture of return air from the conditioned area with the conditioned air stream.

A further object of the invention is to provide improved means for maintaining desired air pressures in the air conditioning ducts adjacent the heat exchangers of the cooling or heating equipment employed for conditioning the air flowing through said ducts so as to insure desired air flow over the heat exchangers, and thereby to maintain desired heat exchange through the heat exchanger surface.

Another object of the invention is to provide improved means for manual selective control of conditioned air distribution in any conditioned area by the occupants thereof.

These and other objects of the invention which will become hereafter apparent are attained by provision of a novel register construction and mode of operation for use at the outlet points of the distribution ducts of an air conditioning system. Thus a duct extends from the heating or cooling coils of the air conditioning equipment to the conditioned areas. The novel register is positioned in these areas to provide desired design conditions. This register comprises a yieldably mounted damper plate selectively movable within the duct to adjustably constrict the flow of air through the duct. A return air inlet is formed in the register to permit air from the conditioned area to be inducted for flow through the register with the conditioned air. The yieldable damper mounting is such that as the static pressure in the duct builds up above a desired design level as determined by the conditions necessary to obtain efficient functioning of the heating or cooling coil, the baffle plate or damper will be displaced to permit air flow through the duct to obtain the desired design pressures. A control knob suitably positioned in the conditioned area is coupled via a control assembly including a rack and a pinion for moving a control rod which acts on the crank of a shaft coupled by a spring clutch to a shaft on which the damper is supported.

An important feature of the invention resides in the novel yieldable mounting for the damper plate which permits selective opening or closing of the register by the occupants of a conditioned area but is responsive to abnormally high pressure conditions in the duct thereby opening the register to provide desired air flow past the heat exchangers in the duct.

Another feature of the invention resides in the arrangement of the baffle plate or damper whereby the quantity of air recirculated from the conditioned area is inversely proportional to the quantity of conditioned air supplied. Thus, the damper is so arranged that as it is moved to constrict the duct, the air velocity emerging from the register increases thereby inducing a greater quantity of air flow through the recirculating intake of the duct.

The specific details of a preferred embodiment of the invention, and their mode of functioning will be particularly pointed out in clear, concise and exact terms in conjunction with the accompanying drawings, wherein:

FIGURE 1 is a schematic view of a portion of an air conditioning system in which a heat exchanger coil is arranged to change the temperature of an air stream flowing along a duct to two distribution points;

FIGURE 2 is a schematic elevational view of a register and control element therefor;

FIGURE 3 is a detail view with parts broken away of the control and the novel damper mounting;

FIGURE 4 is a cross-sectional schematic view taken on line IV—IV of FIGURE 2;

FIGURE 5 is a graph plotting the pressure against the cubic feet per minute of air flow in the duct adjacent the heat exchanger of the system illustrated in FIGURE 1;

Figure 6:
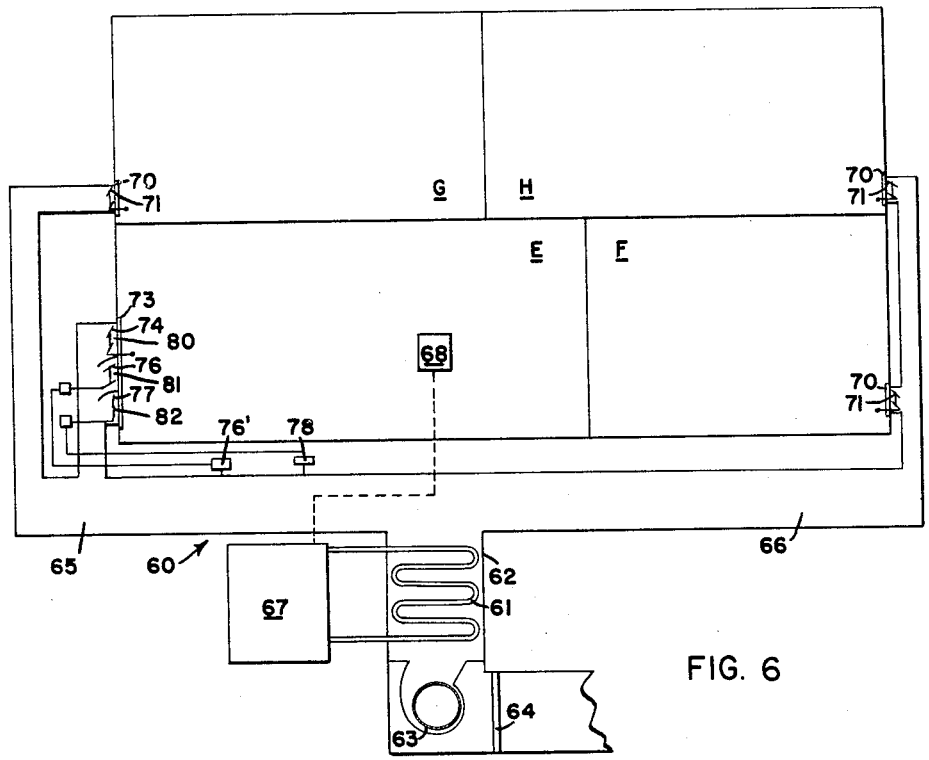
Figure 7:
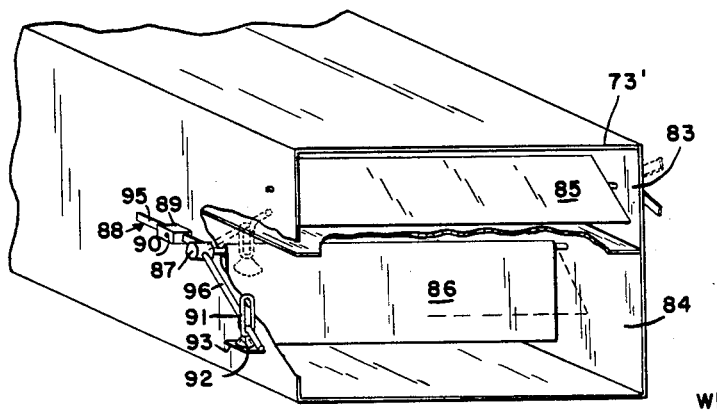

FIGURE 6 is a schematic view of a portion of an air conditioning system embodying a modified means for maintaining a predetermined minimum quantity of air flow over the heat exchanger of the air conditioning system; and FIGURE 7 is a detail view on an enlarged scale, of a further modification of means for maintaining a predetermined minimum quantity of air flow over the heat exchanger of the air conditioning system.

Referring now more particularly to the drawings, like numerals in the various figures will be employed to designate like parts. As best seen in FIGURE 1, an embodiment of the instant invention is illustrated in connection with an air conditioning system 10 which may be employed for heating or cooling a plurality of conditioned areas.

The system 10 comprises an air conditioning source in the form of a heat exchanger 11 arranged within supply duct 12 in heat exchange relationship with the air flowing through the duct. A fan 13 may be utilized in conventional fashion to induce air flow through filter 14 and through duct 12 which confines an air stream along a flow path over heat exchanger 11 to the areas to be conditioned. The heat exchanger 11 is coupled to appropriate heating or cooling apparatus 15 which may be either a furnace, or refrigeration system, as will be understood by those skilled in the art, depending on whether the air conditioning system is to be employed for heating or cooling purposes. It will be further apparent that the heat exchanger 11 may also be of a type which functions alternatively as the evaporator coil of a refrigeration system or the condenser coil of the refrigeration system in which case apparatus 15 will comprise a compressor and alternatively functioning heat exchanger coil along with the appropriate expansion mechanism, reverse valving and controls.

The supply duct 12 is shown to extend to two conditioned areas A and B, it being understood that this is shown by way of example, and that the number of areas to which conditioned air is supplied may be varied as desired and depending on the air handling capacities of fan 13 and the heating and/or cooling capacities of heat exchanger 11.

The normal control for the fan and the central heating or cooling apparatus is provided in a zone other than A or B. Such control may be a thermostat 9 as indicated in FIGURE 1.

Within each conditioned area the supply duct 12 is provided with an outlet 16 to which the novel register 20 is coupled. Register 20 is formed with an outlet grill 21 and a plate member 22 of a suitable configuration to satisfy aesthetic requirements, and to permit desired air flow patterns to be obtained in the conditioned area. A baffle plate or damper 25 is supported on damper shaft 26, shaft 26 and damper 25 being suitably mounted for pivotal movement as seen in FIGURE 4. Damper 25 may be moved from a limiting position abutting stop member 28 and providing full flow of air through outlet grill 21 when the damper 25 is to the right as viewed in FIGURE 4, to a non-flow position when the damper is to the left as viewed in FIGURE 4. Baffle or deflector 24 is provided to prevent air in the duct from passing beneath shaft 26. Stop member 28 is affixed to a wall of the outlet so as to permit continued induction of room air when damper 25 is in the full open position.

The register 20 is formed with a return air inlet 27 to the right of damper 25 as viewed in FIGURE 4.

Adjustment of the position of damper 25 is accomplished by the novel damper mounting which includes a novel yieldable spring clutch 30 shown schematically in FIGURE 3. Clutch 30 comprises a clutch plate 31 arranged over shaft 26 and rotatable freely with respect thereto. A clutch plate 32 is mounted for rotation with a control shaft 33 suitably supported for rotation in bearings 35. A thumb screw 36 connects clutch plate 31 to clutch plate 32 for rotation therewith. Extending from clutch plate 32 is a detent 40 which is movable with the clutch plate 32 into engagement with a lug 41 formed on damper shaft 26. A spring member 45, here illustrated in the shape of a conical coil spring is arranged between clutch plate 31 and damper shaft 26. Spring 45 is wound around shaft 26 and one end of the spring is anchored to move with clutch plate 31 while the other end of spring 45 is secured to a damper shaft 26 for movement therewith. At the free end of control shaft 33, a crank arm 50 is extended.

A control assembly including rod 51 is coupled to the end of crank arm 50 and extends through sleeve 52 to rack 53 which engages pinion 54. A control knob 55 is coupled to pinion 54 in conventional fashion to permit rotation thereof.

Another aspect of the present invention is illustrated in FIGURE 6. Air conditioning system 60 comprises a heat exchanger 61 arranged within main supply duct 62 in heat exchange relationship with the air flowing through the duct. Fan 63 may be utilized to induce air through filter 64 and through main duct 62 to auxiliary ducts 65 and 66. Heat exchanger 61 is coupled to appropriate heating or cooling apparatus 67, similar to apparatus 15 shown in FIGURE 1.

Supply duct 62 connects with auxiliary ducts 65 and 66 which communicate with the areas E, F, G, H to be conditioned. By way of illustration and not limitation, these areas may comprise the living room, dining room, and bedrooms, respectively, in a dwelling.

Ordinarily, a thermostat 68 for controlling the operation of the apparatus 67 and fan 63 is provided in one of the first story rooms of the dwelling, as for example, in the living room E.

Within the areas F, G and H there are provided outlets 70 having adjustable dampers 71 therein for modulating the air flow into each area as desired. The dampers may be controlled manually or automatically as desired.

In area E, outlet 73 is provided with a novel register. Openings 80, 81 and 82 may be defined within the outlet. The register may be provided with a first manually adjustable damper 74, controlling flow through opening 80, a second damper 76 responsive to a predetermined pressure within supply duct 65 sensed by controller 76' for regulating air flow through opening 81, and a third damper 77 responsive to a second predetermined pressure within supply duct 65 sensed by controller 78 for regulating flow through opening 82.

A modification of the means for controlling the air flow through outlet 73 is illustrated in FIGURE 7. In this case, the outlet 73' may have openings 83 and 84. An adjustable damper 85 controls the flow of air through opening 83. Damper 85 may be either manually or automatically adjustable.

Damper 86 pivotally mounted on shaft 87 is designed to perform the functions of both dampers 76 and 77. Secured to shaft 87 is a lever 88 comprised of arms 95 and 96. Adjustably mounted on arm 95 is balance weight 89. The balance weight 89 is connected to arm 95 by suitable fastening means, for example, set screw 90. Arm 96 is movable within elongated opening 91 in weight 92. Thus, it is apparent that after a predetermined rotational movement of damper 86, arm 96 of lever 88 will engage the top of opening 91. Further movement of the damper is resisted until the pressure in the duct system is greater than the resistance provided by the force of weight 92. Then weight 92 is raised from support 93 and damper 86 is moved further toward the full open position to vent air into the area served by outlet 73'.

Operation

The aforedescribed novel register 20 finds particular utility in connection with an air conditioning system having a plurality of distribution points for the conditioned air, remote from the conditioning source. Thus, in an air conditioning system 10 as illustarted in FIGURE 1 novel registers 20 are positioned at the conditioned areas A and B remote from the conditioning source or heat exchanger 11.

The air flow from the conditioning source to the conditioned areas is generally obtained by means of fan 13. As is apparent to those skilled in the art, the quantities of air flowing in heat exchange relationship with heat exchanger 11 determine the heat flow between the heat exchanger and the air stream. The heat exchange equipment is generally designed to operate within given temperature ranges so that in order to obtain given air conditioning temperatures the heat exchanger is designed of a given capacity to accommodate the heating and/or cooling loads of the conditioned areas. Since the capacity of the heat exchange equipment is such that maximum operating efficiency is obtained within given temperature ranges, it is desirable to insure the presence of air flow over the heat exchanger 11 so as to obtain these desired temperatures ranges. Similarly, the air handling capacities of the duct 12 and fan 13 are selected to provide desired design conditions.

Where an air conditioning system is installed in which the occupants of individual conditioned areas may selectively determine whether conditioned air will be provided from the supply duct, it is necessary to make certain that the adjustment of air supply in any one conditioned area will not affect the operation of the air conditioning system to the detriment of other areas. This is accomplished by the adjustable register 20 of the present invention.

In use, the occupant of any given conditioned area, A or B as illustrated in FIGURE 1, may selectively determine the flow of air into the conditioned area by adjusting control knob 55. Rotation of knob 55 rotates pinion 54 which in turn acts on rack 53 to move same thereby pulling on rod 51 which in turn pulls crank arm 50. The pull on crank arm 50 affects rotation of shaft 33 which moves detent 40 against lug 41 causing shaft 26 to rotate with resulting movement of baffle 25.

When baffle 25 is moved via the aforedescribed adjusting mechanism to a position closing off the flow of air through register 20, as effected by moving baffle 25 to the left as viewed in FIGURE 4, there will be a reduction in the quantity of air flowing through the system. When this flow of air drops beneath a desired design level, the spring 45 which has been preselected to yield under a stress indicating a pressure above desired design pressure in the supply duct 12. As a result of this yielding, baffle 25 will move against the biasing action of spring 45 towards the right as viewed in FIGURE 4, thereby increasing the flow of air through register 20, notwithstanding the manual adjustment made by the room occupant.

When it is desired to vary the preselected yield value of spring 45, thumb screw 36 may be loosened and clutch plates 31 and 32 may be suitably rotated with respect to one another. The thumb screw or other suitable fastening means, as for example, a set screw, may then be moved to secure the plates 31 and 32 together.

It will be observed that when the baffle plate is moved towards a closed position, the increase in air velocity resulting from the construction of flow through register 20 will increase the quantity of air induced via return air opening 27.

In FIGURE 5, the graph illustrates the static pressure within the duct required to give desired air flow for design conditions to obtain. Thus, as indicated on the graph, as the cubic feet per minute of air flow through supply duct 12 increases, there is a proportionate drop in the static pressure in the duct. Points C and D on the curve illustrate a desired design range within which the air flow through the duct work should operate to obtain efficient heat exchanger operation. Point C indicates the optimum desired fan loading condition, and point D indicates minimum conditions acceptable. Spring 45 is accordingly selected to yield under a pressure greater than that at point D so that the baffle will open, or move to the right as indicated in FIGURE 4, thereby increasing duct air flow and bring the system within its desired design range.

The novel mechanism for controlling the air flow through outlet 73 in area E functions to assure that the adjustment of the air supply in each of a plurality of areas will not adversely affect the operation of the air conditioning system.

Assume that each of the dampers 71 are adjusted so that the desired quantity of air is passing over heating or cooling apparatus 67. Thermostat 68 controls the normal operation of apparatus 67 and fan 63. If one or more of the dampers 71 are closed, there is a reduced load requirement and the air supply over heat exchanger 61 may be adversely affected. The static pressure rise within the supply duct will be sensed by controller 76' which will actuate damper 76 toward the open position. If the duct pressure rises to a second predetermined level, controller 78 will actuate damper 77 toward open position. The increased discharge of air into area E will function to insure desired air flow over heat exchanger 61 and will also relatively quickly influence thermostat 68 to terminate fan and/or heating or cooling apparatus operation.

The control mechanism shown in FIGURE 7 functions in a like manner to that shown in FIGURE 6. Damper 85 may be adjusted to permit a desired flow of air into area E. If one or more of the dampers in the other areas are closed and the pressure rises undesirably in the supply duct, the damper 86 will be pivoted toward open position. Rotational movement of the damper will be stopped when lever arm 88 reaches the limit of the lost motion connection provided by the opening 91 in weight 92 through which the lever arm 88 extends.

If there is adequate air flow over heat exchanger 61, system operation will again be controlled by thermostat 68. On the other hand, upon a further rise in the static pressure above a predetermined value such as will overcome the force exerted by weight 92, damper 86 will be pivoted toward the full open position.

It is then seen that operation of an air conditioning system provided with the present invention is enhanced. Improved means have been provided for controlling air distribution from a central conditioning point at a variety of different distribution points with the control action provided at any one distribution point not adversely affecting the operation of the conditioning equipment. Further, there has been provided novel adjustable register means for use in an air distribution system in which manual adjustment of air discharge may be provided, but individual adjustment may not function to cause the system to operate in an improper manner.

While I have shown preferred embodiments of my invention, it is obvious that other modifications will be apparent to persons skilled in the art, and I desire that my invention be limited only within the scope of the appended claims.

I claim:

1. An adjustable air discharge register comprising an outlet grill adapted for arrangement in an area to which air is to be supplied, a damper movably positioned behind said grill to control the flow of air therethrough, a mounting supporting said damper for selective positioning to control air flow through said grill, means to position said damper, said positioning means being yieldable in response to pressure conditions of the air adjacent the damper, and a control assembly coupled to said positioning means to permit selective movement of said damper, said mounting including a damper shaft and the positioning means including control shaft means and yieldable spring clutch means between the damper shaft and the control shaft.

2. Apparatus for controlling air distribution to a conditioned area, said apparatus comprising: a duct confining an air stream along a flow path from a conditioning source to a conditioned area; a damper pivotally mounted in the duct to control the flow of air therethrough; control linkage means coupled to said damper to permit adjustable positioning thereof; a control knob coupled to said control linkage means to permit manual movement of said linkage; a damper shaft supporting said damper for pivotal movement; and yieldable clutch means between said control linkage means and said damper shaft effective to permit the damper to respond to air pressures in said duct to adjust its position when the air pressure in said duct rises above a desired preselected value.

3. Apparatus as in claim 2 in which said yieldable clutch means comprises: a first clutch member, a second clutch member and means adjustably securing said first and second clutch members together.

4. Apparatus as in claim 3 in which said yieldable clutch means comprises: a spring member secured at one end to said damper shaft and at said other end to one of said clutch members, whereby adjustment of said clutch members with respect to one another adjusts the tension of the spring member.

References Cited in the file of this patent
UNITED STATES PATENTS

| | | |
|---|---|---|
| 372,503 | Wheeler | Nov. 1, 1887 |
| 2,157,025 | Snediker | May 2, 1939 |
| 2,286,294 | Mallory | June 16, 1942 |
| 2,579,507 | MacCracken | Dec. 25, 1951 |
| 2,858,759 | Kice et al. | Nov. 4, 1958 |

UNITED STATES PATENT OFFICE
CERTIFICATE OF CORRECTION

Patent No. 3,163,100                            December 29, 1964

William L. McGrath

It is hereby certified that error appears in the above numbered patent requiring correction and that the said Letters Patent should read as corrected below.

Column 2, line 38, for "inducted" read -- induced --; column 5, line 13, for "illustarted" read -- illustrated --.

Signed and sealed this 18th day of May 1965.

(SEAL)
Attest:

ERNEST W. SWIDER                          EDWARD J. BRENNER
Attesting Officer                            Commissioner of Patents